(12) United States Patent
Alam et al.

(10) Patent No.: US 10,291,691 B2
(45) Date of Patent: May 14, 2019

(54) SYSTEM, METHOD AND RECORDING MEDIUM FOR CREATING A SOCIAL MEDIA SENSING POST

(71) Applicant: International Business Machines Corporation, Armonk, NY (US)

(72) Inventors: Nebula Alam, Essendon (AU); Jorge Andres Moros Ortiz, Carlton (AU); Shaila Pervin, Docklands (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 15/239,414

(22) Filed: Aug. 17, 2016

(65) Prior Publication Data
US 2018/0054473 A1 Feb. 22, 2018

(51) Int. Cl.
*H04L 29/08* (2006.01)
*G06F 17/30* (2006.01)

(52) U.S. Cl.
CPC ........ *H04L 67/10* (2013.01); *G06F 17/30575* (2013.01); *H04L 67/125* (2013.01)

(58) Field of Classification Search
CPC .. H04L 67/10; H04L 67/125; G06F 17/30575
See application file for complete search history.

(56) References Cited

U.S. PATENT DOCUMENTS

| | | | | |
|---|---|---|---|---|
| 2014/0282735 | A1* | 9/2014 | Davis | H04N 21/482 725/48 |
| 2015/0324692 | A1* | 11/2015 | Ritchey | G03B 37/00 348/14.08 |
| 2016/0007915 | A1* | 1/2016 | Berka | A61B 5/02405 600/301 |
| 2016/0142891 | A1* | 5/2016 | Virhia | G06Q 10/00 340/870.07 |
| 2016/0258877 | A1* | 9/2016 | Al Hosani | G01N 21/85 |
| 2016/0359880 | A1* | 12/2016 | Pang | H04L 63/1425 |
| 2017/0206095 | A1* | 7/2017 | Gibbs | G06F 3/167 |
| 2017/0307435 | A1* | 10/2017 | Park | G01H 3/125 |
| 2018/0081439 | A1* | 3/2018 | Daniels | G06F 1/163 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Abdullahi E Salad
(74) *Attorney, Agent, or Firm* — Grant Johnson, Esq.; McGinn IP Law Group, PLLC

(57) ABSTRACT

A social media sensing post creating method, system, and computer program product, include connecting to a plurality of devices within a predetermined area of a first user to create a sensing network, collecting multisensory data describing an experience of the first user using the sensing network, and creating a social status depicting the experience of the first user from the multisensory data to recreate memory on a later time, or to transmit the same environmental feelings to a second person.

20 Claims, 4 Drawing Sheets

SYSTEM, METHOD AND RECORDING MEDIUM FOR CREATING A SOCIAL MEDIA SENSING POST

BACKGROUND

The present invention relates generally to a social media sensing post creating method, and more particularly, but not by way of limitation, to a system, method, and recording medium for creating a social media sensing experience.

Social media technology has become pervasive over the last years, facilitating users to engage and share their experiences with their networks. Also, parallel sensor technology is becoming more embedded in our day-to-day lives, surfacing an opportunity to capture moments with rich amounts of information and detail.

Current social media platforms do not leverage input when posting beyond text images, photos and sounds, and in some cases step and heart rate data such that the user's social experience is limited.

However, needs in the art include the needs to create a social media sensing experience repayable by network peers using immersive bodily sensing stimulus technologies to re-live the experience of the creator.

SUMMARY

In an exemplary embodiment, the present invention can provide a computer-implemented social media sensing post creating method, the method including connecting to a plurality of devices within a predetermined area of a first user to create a sensing network, collecting multisensory data describing an experience of the first user using the sensing network, and creating a social status depicting the experience of the first user from the multisensory data.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which FIG. 1 exemplarily shows a high-level flow chart for a social media sensing post creating method 100.

DETAILED DESCRIPTION

Figure 1:
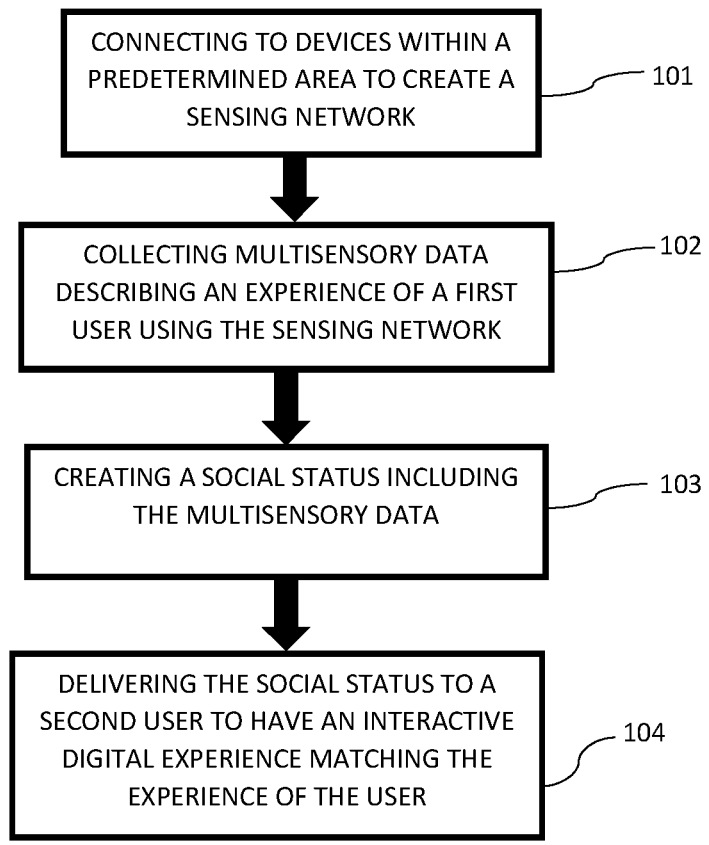

The invention will now be described with reference to FIG. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the social media sensing post creating method 100 includes various steps to create a social status including multisensory data indicating the user's experience for a second user to receive and experience. As shown in at least FIG. 2, one or more computers of a computer system 12 according to an embodiment of the present invention can include a memory 28 having instructions stored in a storage system to perform the steps of FIG. 1.

Thus, the social media sensing post creating method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 2-4) may be implemented in a cloud environment 50 (see e.g., FIG. 3), it is nonetheless understood that the present invention can be implemented outside of the cloud environment.

In step 101, devices within a predetermined area of a first user are connected to create a sensing network. The predetermined area can be determined by the first user or can be intelligently selected based on a Natural Language Processor (NLP) analyzing the type of event (e.g., data from a national park may be taken from sensors in a larger area than data from the home of the user). Also, the predetermined area can be based on a number of devices in the predetermined area. For example, if no devices are within a first predetermined area, the predetermined area is expanded to connect with devices.

In some embodiments, as the first user initiates the social media sensing post creating method 100, the first user enables permissions to use sensors on their devices, wearables and other devices to connect to all devices in a proximity (e.g., within a predetermined area), including other users devices to create a sensing network.

In some embodiments, the connected devices in the sensing network comprise environment sensors including cameras, audio detectors, temperature sensors, smell sensors, wind speed sensor, etc., Internet of Things (IoT)-enabled devices, devices comprising media content in relation to an event, a place, time, etc., wearable devices such as a Fitbit™, smart watch, etc., social media enabled devices, electronic devices, an IoT-enabled sensor comprising a social media graph of the user, etc.

In step 102, multisensory data describing an experience of the first user is collecting using the connected devices in the sensing network. That is, the connected devices in the sensing network collect available multisensory data, including, but not limited to, physiological data, an aggregated sentiment analysis from social media (e.g., is the user happy, sad, scared, anxious, satisfied, tired, etc.), a music type, weather, a humidity level, social media key words in the event or place (e.g., crowd vibes), a lighting, a color scheme, sounds, quantitative data from users in the crowd (e.g., anonymous except for the person posting if they choose so), images, videos, 360°-video, smell data, and any other data which forms part of that experience for the user. In other words, the multisensory data comprises data to describe an immersive experience of the first user to share with other users.

The user can selectively choose how much to share. When the first user is posting by default, all the available data will be used. However, if the first user can see the breakdown of sensors available in simple terms (temperature: on/off, etc.), such will the user offer full control as to which sensors to use for their social status.

In step 102, the multisensory data can be leveraged using a Natural Language Processor (NLP) to improve the relevance of the data. In some embodiments, the NLP can process a context of the first user. For example, the NLP can cause additional smell data and image data for flowers to be collected if the first user describes the moment as "the flowers smell amazing" because the context of the post is flowers and smell. On the other hand, the NLP can cause focused images on a bee and sound data of the buzzing of the bee to be collected in the same environment if the first user describes the moment as "this bee looks so peaceful and sounds amazing".

That is, via the NLP, the multisensory data can be intelligently collected to reflect the context of the first user's environment.

In step 103, a social status (e.g., a social media sensing post) comprising the multisensory data is created. The content from the user (e.g., a user post) and the multisensory data collected by the sensing network is processed through a random visual representation algorithm that considers aesthetic design to create the social status.

Although in a preferred embodiment the social status can comprise a status update on a social media provider such as FaceBook™ or Twitter™, the invention is not limited thereto. The social status can comprise a packaged data file that can be delivered via e-mail, text message, downloadable to a disk, etc.

The social status comprises a mapped function of each of the multisensory data such that a second user can experience each of the multisensory data when the second user receives the social status (as described later).

In step 104, the social status is delivered to a second user such that the second user has an interactive digital experience matching the experience of the first user. In other words, the social status is delivered to the second user via an interactive digital experience device that may include a video screen, headphones, Virtual Reality apparatus, an Augmented Reality apparatus, bodily sensing stimulus technology, etc. such that the second user can be immersed in the same multisensory data as the first user. It is noted that the environment of the first user is matched in the delivery to the second user. For example, if a user suffers from heights, and the other user loves the view, the experience of fear may not be matched but the environment may be as its subject to the users perception. For example, if the multisensory data included a temperature, a wind speed, a brightness of the light, and a smell which created the social status, the interactive digital experience device would replicate the temperature (e.g., increasing a temperature of a suit worn by the second user), the wind speed (e.g., blowing wind past the second user's ears), the smell by emitting a smell matching the smell in the multisensory data, and creating a brightness mimicking the brightness of the multisensory data. Thereby, the second user can experience the multisensory data in which the first user is immersed when the second user receives the social status.

Thus, the social status captures moments in social media with rich sensing qualitative/quantitative data to be re-live by the second user in a full sensory level experience. That is, by leveraging mobile sensors, IoT-enabled devices, NLP, social media network awareness, the first users post is enhanced to represent the experience. The captured experience can be delivered using bodily sensing stimulus technologies to simulate the experience.

It is noted that the social status can further be delivered graphically (for example) to be observed by the second user to imagine the experience of the first user. In this manner, the second user can know much more about the experience of the first user beyond the conventional image/video and textual post in social media settings.

In one exemplary embodiment, a first user is driving through a national park. The first user decides to post from her device about the flowery valley through which she is driving. A sensing network is created by connecting to devices within a predetermined area (e.g., a mile). The sensing network collects multisensory data describing the experience of the first user. Multilayer aspects of the experience are captured, such as smell, temperature, sounds, images/360 video, wind speed, as well as user physiological and social media data (e.g., multisensory data about how users experience the national park). That is, the sensing network is leveraged using the IoT-enabled devices, physiological signals, wearables, social media, mobile and environmental sensors to fetch available multisensory data to create a social status. The social status is delivered to a second user who is a social media friend of the first user such that the second user can play the social status over the body stimulus immersive experience. The second user can then experience the data captured, and through this, experience part of what the first user meant to share.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
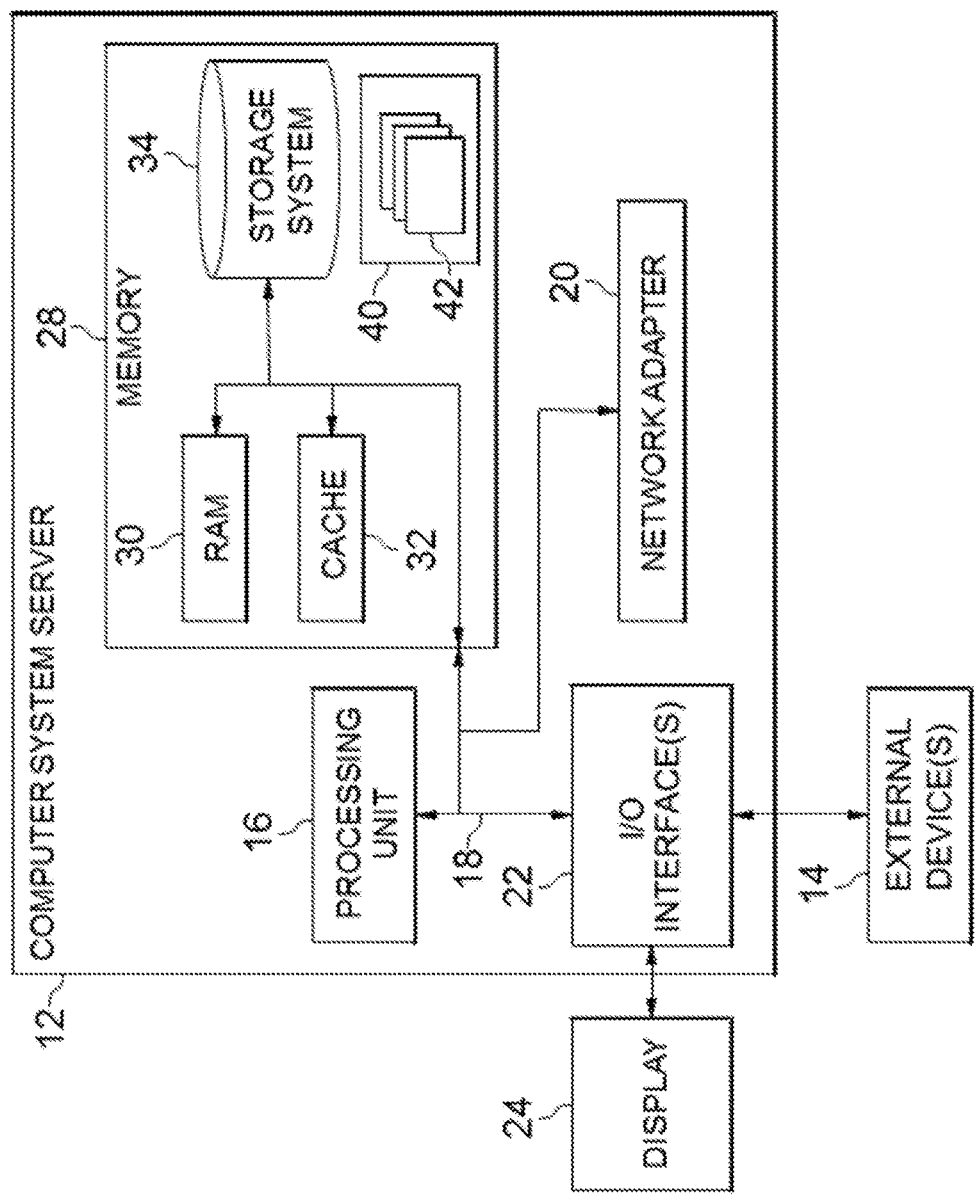
FIG. 2 depicts a cloud computing node 10 according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
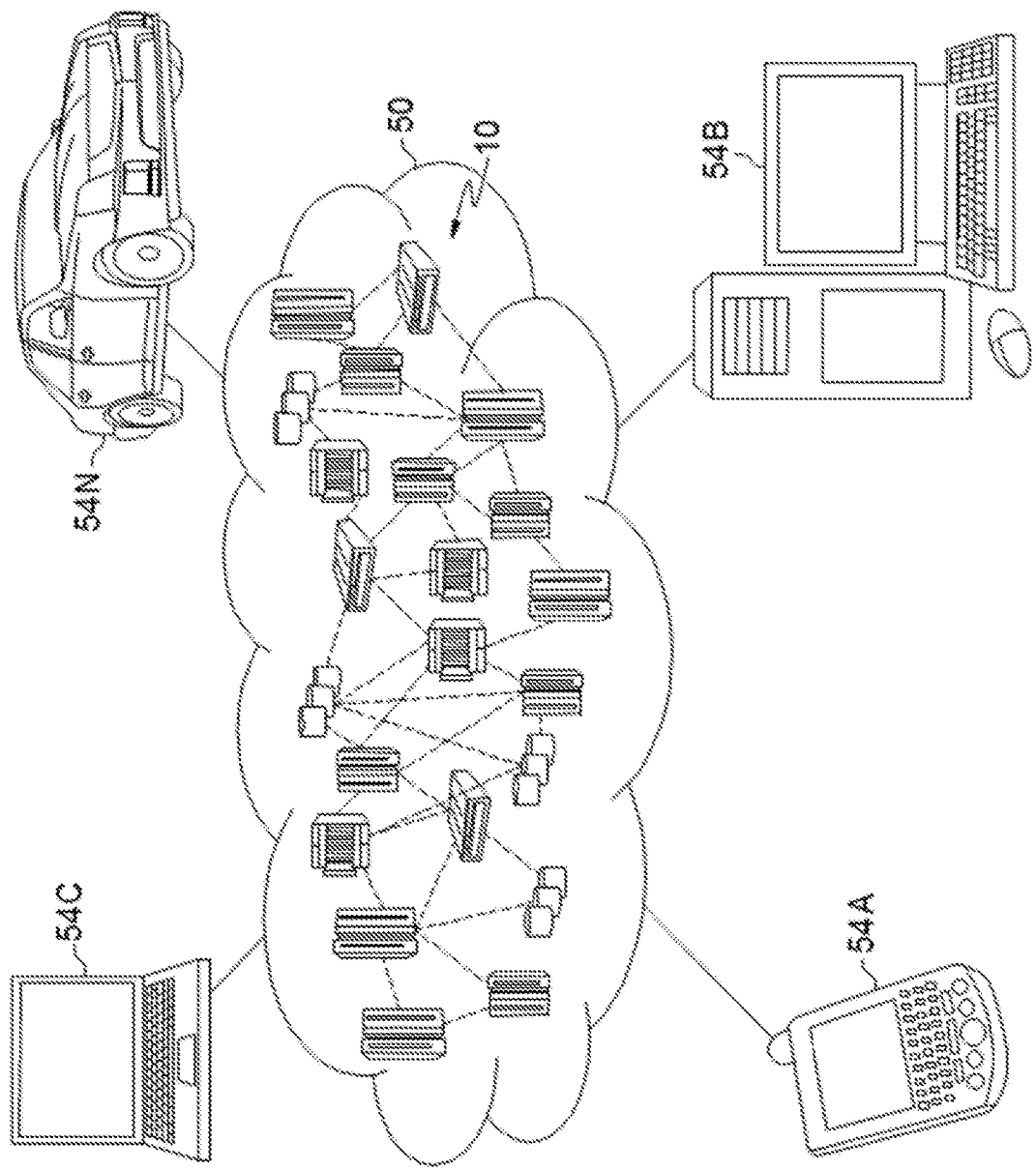
FIG. 3 depicts a cloud computing environment 50 according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
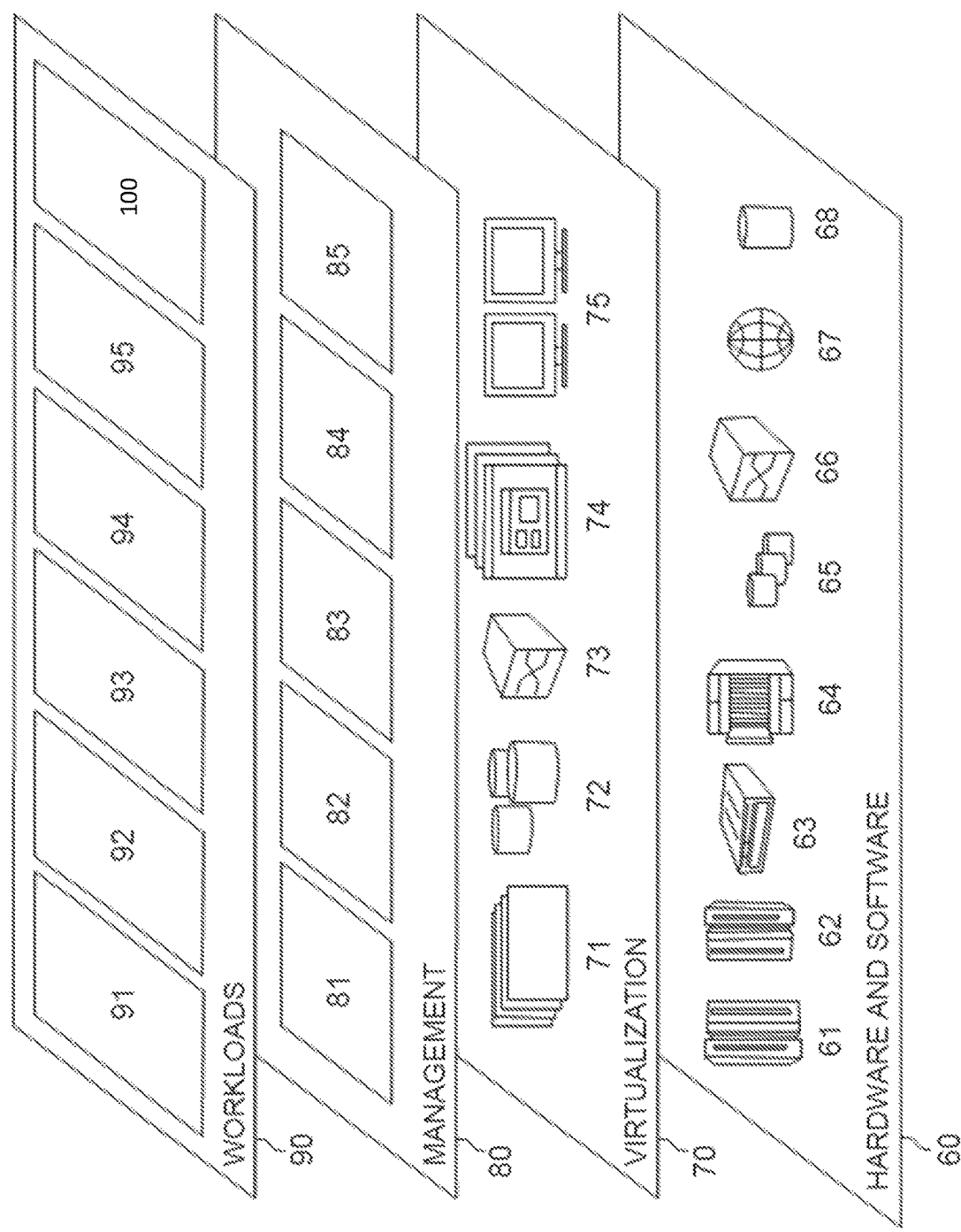
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the social media sensing post creating method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented social media sensing post creating method, the method comprising:
   connecting to a plurality of devices within a predetermined area of a first user to create a sensing network;
   collecting multisensory data describing an experience of the first user using the sensing network;

creating a social status depicting the experience of the first user from the multisensory data by leveraging the multisensory data to process qualitative and quantitative data to reflect how the experience is perceived by the user; and delivering the social status to a second user via an interactive digital experience device that replicates the multisensory data of the social status such that the second user feels the experience of the first user, wherein a context of the first user is determined to focus the collecting on collecting multisensory data describing the context of the first user, and wherein the delivering delivers the social status to the second user via the interactive digital experience device with the context of the first user as an emphasized feature such that the second user feels the emphasized feature as part of the experience of the first user more than a second feature.

2. The computer-implemented method of claim 1, wherein the plurality of devices are selected from a group consisting of:
an environment sensor including at least one of a camera, an audio detector, a temperature sensor, a smell sensor, and a wind speed sensor;
an Internet of Things (IoT)-enabled device,
a device comprising media content;
a wearable device;
a social media-enabled device;
an electronic device; and
an IoT-enabled sensor comprising a social media graph of the first user.

3. The computer-implemented method of claim 1, wherein the multisensory data is selected from a group consisting of:
physiological data;
an aggregated sentiment analysis from social media;
an emotional state of the first user;
a type of music being played;
weather data;
a crowd vibe;
a lighting of the environment;
a color scheme;
sounds in the environment;
quantitative data from other users;
an image;
a video;
a 360°-video; and
smell data.

4. The computer-implemented method of claim 1, further comprising delivering the social status to the second user to have an interactive digital environment matching the experience of the first user.

5. The computer-implemented method of claim 4, wherein the delivering delivers the social status via the interactive digital experience device that immerses the second user in the multisensory data of the social status.

6. The computer-implemented method of claim 1, wherein the interactive digital experience device is selected from a group consisting of:
a video screen;
a headphone;
a Virtual Reality (VR) apparatus;
an Augmented Reality (AR) apparatus; and
a bodily sensing stimulus technology.

7. The computer-implemented method of claim 5, wherein the interactive digital experience device is selected from a group consisting of:
a video screen;
a headphone;
a Virtual Reality (VR) apparatus;
an Augmented Reality (AR) apparatus; and
a bodily sensing stimulus technology.

8. The computer-implemented method of claim 1, wherein the multisensory data comprises a textual description of the social status by the first user, and
wherein the textual description is leveraged using a Natural Language Processor (NLP) to determine the context of the first user to focus the collecting on collecting multisensory data describing the context of the first user.

9. The computer-implemented method of claim 8, wherein the collecting collects additional multisensory data by enhancing aspects of the context of the first user to replicate the multisensory data of the social status such that the second user feels the experience of the first user.

10. The computer-implemented method of claim 1, wherein the collecting collects additional multisensory data by enhancing aspects of the context of the first user to replicate the multisensory data of the social status such that the second user feels the experience of the first user.

11. The computer-implemented method of claim 1, embodied in a cloud-computing environment.

12. A computer program product for social media sensing post creating, the computer program product comprising a computer-readable storage medium having program instructions embodied therewith, the program instructions executable by a computer to cause the computer to perform:
connecting to a plurality of devices within a predetermined area of a first user to create a sensing network;
collecting multisensory data describing an experience of the first user using the sensing network;
creating a social status depicting the experience of the first user from the multisensory data by leveraging the multisensory data to process qualitative and quantitative data to reflect how the experience is perceived by the user; and
delivering the social status to a second user via an interactive digital experience device that replicates the multisensory data of the social status such that the second user feels the experience of the first user,
wherein a context of the first user is determined to focus the collecting on collecting multisensory data describing the context of the first user, and
wherein the delivering delivers the social status to the second user via the interactive digital experience device with the context of the first user as an emphasized feature such that the second user feels the emphasized feature as part of the experience of the first user more than a second feature.

13. The computer program product of claim 12, wherein the plurality of devices are selected from a group consisting of:
an environment sensor including at least one of a camera, an audio detector, a temperature sensor, a smell sensor, and a wind speed sensor;
an Internet of Things (IoT)-enabled device,
a device comprising media content;
a wearable device;
a social media-enabled device;
an electronic device; and
an IoT-enabled sensor comprising a social media graph of the first user.

14. The computer program product of claim 12, further comprising delivering the social status to a second user to have the interactive digital experience matching the experience of the first user.

15. The computer program product of claim 12, wherein the delivering delivers the social status via the interactive digital experience device that immerses the second user in the multisensory data of the social status.

16. The computer program product of claim 15, wherein the interactive digital experience device is selected from a group consisting of:
   a video screen;
   a headphone;
   a Virtual Reality (VR) apparatus;
   an Augmented Reality (AR) apparatus; and
   a bodily sensing stimulus technology.

17. The computer program product of claim 12, wherein the interactive digital experience device is selected from a group consisting of:
   a video screen;
   a headphone;
   a Virtual Reality (VR) apparatus;
   an Augmented Reality (AR) apparatus; and
   a bodily sensing stimulus technology.

18. The computer program product of claim 12, wherein the multisensory data comprises a textual description of the social status by the first user, and
   wherein the textual description is leveraged using a Natural Language Processor (NLP) to determine the context of the first user to focus the collecting on collecting multisensory data describing the context of the first user.

19. A social media sensing post creating system, said system comprising:
   a processor; and
   a memory, the memory storing instructions to cause the processor to:
      connect to a plurality of devices within a predetermined area of a first user to create a sensing network;
      collect multisensory data describing an experience of the first user using the sensing network;
      create a social status depicting the experience of the first user from the multisensory data by leveraging the multisensory data to process qualitative and quantitative data to reflect how the experience is perceived by the user; and
      deliver the social status to a second user via an interactive digital experience device that replicates the multisensory data of the social status such that the second user feels the experience of the first user,
   wherein a context of the first user is determined to focus the collecting on collecting multisensory data describing the context of the first user; and
   wherein the delivering delivers the social status to the second user via the interactive digital experience device with the context of the first user as an emphasized feature such that the second user feels the emphasized feature as part of the experience of the first user more than a second feature.

20. The system of claim 19, embodied in a cloud-computing environment.

* * * * *